US008990497B2

(12) United States Patent
Gray et al.

(10) Patent No.: US 8,990,497 B2
(45) Date of Patent: Mar. 24, 2015

(54) EFFICIENT MEMORY MANAGEMENT FOR PARALLEL SYNCHRONOUS COMPUTING SYSTEMS

(71) Applicant: Grayskytech LLC, Woodinville, WA (US)

(72) Inventors: Jerrold L Gray, Woodinville, WA (US); Jason M Smith, Redmond, WA (US)

(73) Assignee: Grayskytech, LLC, Woodinville, WA (US)

(*) Notice: Subject to any disclaimer, the term of this patent is extended or adjusted under 35 U.S.C. 154(b) by 163 days.

(21) Appl. No.: 13/932,847

(22) Filed: Jul. 1, 2013

(65) Prior Publication Data

US 2014/0006724 A1    Jan. 2, 2014

Related U.S. Application Data

(60) Provisional application No. 61/667,131, filed on Jul. 2, 2012.

(51) Int. Cl.
*G06F 12/00* (2006.01)
*G06F 12/08* (2006.01)
*G06F 13/14* (2006.01)
*G06F 13/16* (2006.01)
*G06F 13/00* (2006.01)
*G06F 12/02* (2006.01)
*G06F 9/52* (2006.01)

(52) U.S. Cl.
CPC ............... *G06F 12/00* (2013.01); *G06F 12/08* (2013.01); *G06F 13/14* (2013.01); *G06F 13/1673* (2013.01); *G06F 13/1652* (2013.01); *G06F 13/00* (2013.01); *G06F 12/0284* (2013.01); *G06F 13/1668* (2013.01); *G06F 13/1689* (2013.01); *G06F 9/522* (2013.01); *G06F 13/1694* (2013.01); *G06F 13/1657* (2013.01); *G06F 9/52* (2013.01)
USPC ........................................... 711/117; 711/147

(58) Field of Classification Search
CPC ..... G06F 12/00; G06F 12/0284; G06F 12/08; G06F 9/52; G06F 9/522; G06F 13/00; G06F 13/14; G06F 13/1652; G06F 13/1657; G06F 13/1668; G06F 13/1673; G06F 13/1689; G06F 13/1694
See application file for complete search history.

(56) References Cited

U.S. PATENT DOCUMENTS 5,434,995 A * 7/1995 Oberlin et al. ................ 713/375

OTHER PUBLICATIONS

Wikipedia, "Bulk synchronous parallel", Internet article, accessed Jun. 21, 2013.

*Primary Examiner* — Shawn X Gu
(74) *Attorney, Agent, or Firm* — Nathaniel A. Gilder; Jensen & Puntigam, PS

(57) ABSTRACT

Technologies relating to efficient memory management for parallel synchronous computing systems are disclosed. Parallel synchronous computing systems may include, for example, a host, a memory management subsystem, and an array of processing units adapted to execute in parallel. Memory management may be implemented at least in part via the memory management subsystem. A memory management subsystem may include one or more memory subsystem layers deployed between the host and the array of processing units. Each memory subsystem layer may have a local memory accessible by entities (whether the host or another layer) above the memory subsystem layer; and a memory controller adapted to manage communications between the entities (whether another layer or the processing units in the array) below the memory subsystem layer.

20 Claims, 10 Drawing Sheets

EFFICIENT MEMORY MANAGEMENT FOR PARALLEL SYNCHRONOUS COMPUTING SYSTEMS

CROSS REFERENCE TO RELATED APPLICATIONS

This is a nonprovisional claiming priority of U.S. Provisional Patent Application 61/667,131, filed Jul. 2, 2012, entitled "EFFICIENT MEMORY MANAGEMENT FOR PARALLEL SYNCHRONOUS COMPUTING SYSTEMS", which is incorporated by reference.

BACKGROUND

Conventional systems of computer arrays or clusters range from loosely coupled systems that communicate across Ethernet to systems including moderately coupled cores such as found in the symmetric multi-processing of multi-core Central Processing Unit (CPU) chips. These may be built with large instruction set CPUs with fast local cache memory supplementing shared Synchronous Dynamic Random Access Memory (SDRAM).

Large scale distributed model computing may include some level of synchronization such as Bulk Synchronous Parallel (BSP) processing, in which synchronization and communication are built into the model, as opposed to Parallel Random Access Machines (PRAM) in which synchronization and communication issues may be only minimally addressed. The BSP and PRAM processes cycle between a "concurrent computation" phase and a "communication" phase; with the BSP adding a "barrier synchronization" phase. Such cycles are referred to in the industry as a "superstep".

Both BSP and PRAM architectures may have built in hardware, firmware, cores and protocols to assist and/or carry out some communication and synchronization operations, but software components generally take on responsibility for many communication and synchronization operations at a task level and/or Operating System (OS) level. Furthermore, a dynamic point-to-point communication network between processors is generally assumed to exist.

Problems that involve large amounts of processing time between synchronization steps can tolerate the low Input/Output (I/O) and synchronization properties of PRAM. Problems that involve frequent synchronization and I/O may generally use BSP or something better.

SUMMARY

The present disclosure describes technologies including devices, methods, and computer readable media relating to efficient memory management for parallel synchronous computing systems. Parallel synchronous computing systems may include, for example, a host, a memory management subsystem, and an array of processing units adapted to execute in parallel. Example parallel synchronous computing systems may be adapted for simulation, and optionally for logic simulation, as described herein.

Example memory management subsystems may include, inter alia, at least one memory subsystem layer adapted for deployment between the host and the array of processing units. The at least one memory subsystem layer may comprise a memory controller and a local memory. The at least one memory subsystem layer may be adapted store, in the local memory, either a continuous image of concatenated memories of the processing units in the array, or a continuous image of concatenated memories of components in a memory subsystem layer between the at least one memory subsystem layer and the processing units in the array. Furthermore, the memory controller may be adapted to manage communications between the local memory and either the processing units in the array, or the components in the memory subsystem layer between the at least one memory subsystem layer and the processing units in the array.

Memory management subsystem embodiments comprising multiple memory subsystem layers may include, for example, a network layer adapted store, in the local memory thereof, a continuous image of concatenated backplane memories of backplane components in a backplane layer between the network layer and the processing units in the array; a backplane layer adapted store, in the local memory thereof, a continuous image of concatenated Printed Circuit Board (PCB) memories of PCB components in a PCB layer between the backplane layer and the processing units in the array; and/or PCB layer adapted store, in the local memory thereof, a continuous image of concatenated memories of the processing units in the array. For example, in some embodiments, memory management subsystem may include a network layer, a backplane layer, and a PCB layer, in a hierarchical arrangement between the host and the processing units in the array.

Managing communications between the local memory and the processing units in the array/components of the next memory subsystem layer may include, for example, managing communications according to a configuration setting received from the host. The configuration setting may comprise, e.g., a system initialization setting to configure the at least one memory subsystem layer to provide run-time functionality to the processing units in the array. The configuration setting may comprise, e.g., a superstep Input/Output (I/O) handling setting to configure the at least one memory subsystem layer to supply input data to, and receive output data from, the processing units in the array. Example configuration settings include: a memory mirror setting to configure the at least one memory subsystem layer to place a copy of data in each of the memories of the processing units in the array/components of the next memory subsystem layer; a memory broadcast setting to configure the at least one memory subsystem layer to broadcast data received at the at least one memory subsystem layer to each the processing units in the array/components of the next memory subsystem layer; and a point to point setting to configure the at least one memory subsystem layer sequentially transmit and receive data to and from each of the processing units in the array/components of the next memory subsystem layer.

Example memory management methods may include, inter alia, storing, by at least one memory subsystem layer in a local memory within the at least one memory subsystem layer, either a continuous image of concatenated memories of the processing units in the array, or a continuous image of concatenated memories of components in a memory subsystem layer between the at least one memory subsystem layer and the processing units in the array; and managing, by a memory controller in the at least one memory subsystem layer, communications between the local memory and either the processing units in the array, or the components in the memory subsystem layer between the at least one memory subsystem layer and the processing units in the array. The at least one memory subsystem layer may comprise, for example, a network layer, a backplane layer, or a PCB layer, and methods involving multiple memory subsystem layers may comprise storing/managing operations at each of the memory subsystem layers. Managing communications may be performed according to a configuration setting received from the host, and example methods may comprise host operations to configure the memory management subsystem.

Other features, objects and advantages of this disclosure will become apparent from the following description, taken in connection with the accompanying drawings, wherein, by way of illustration, example embodiments of the invention are disclosed.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention

DETAILED DESCRIPTION

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

The present disclosure describes, inter alia, technologies relating to efficient memory management for parallel synchronous computing systems. Parallel synchronous computing systems may include, for example, a host, a memory management subsystem, and an array of processing units adapted to execute in parallel. Memory management may be implemented at least in part via the memory management subsystem. Example memory management subsystems may include one or more memory subsystem layers deployed between the host and the array of processing units. Each memory subsystem layer may have a local memory accessible by entities (whether the host or another layer) above the memory subsystem layer; and a memory controller adapted to manage communications between the entities (whether another layer or the processing units in the array) below the memory subsystem layer.

Figure 1:
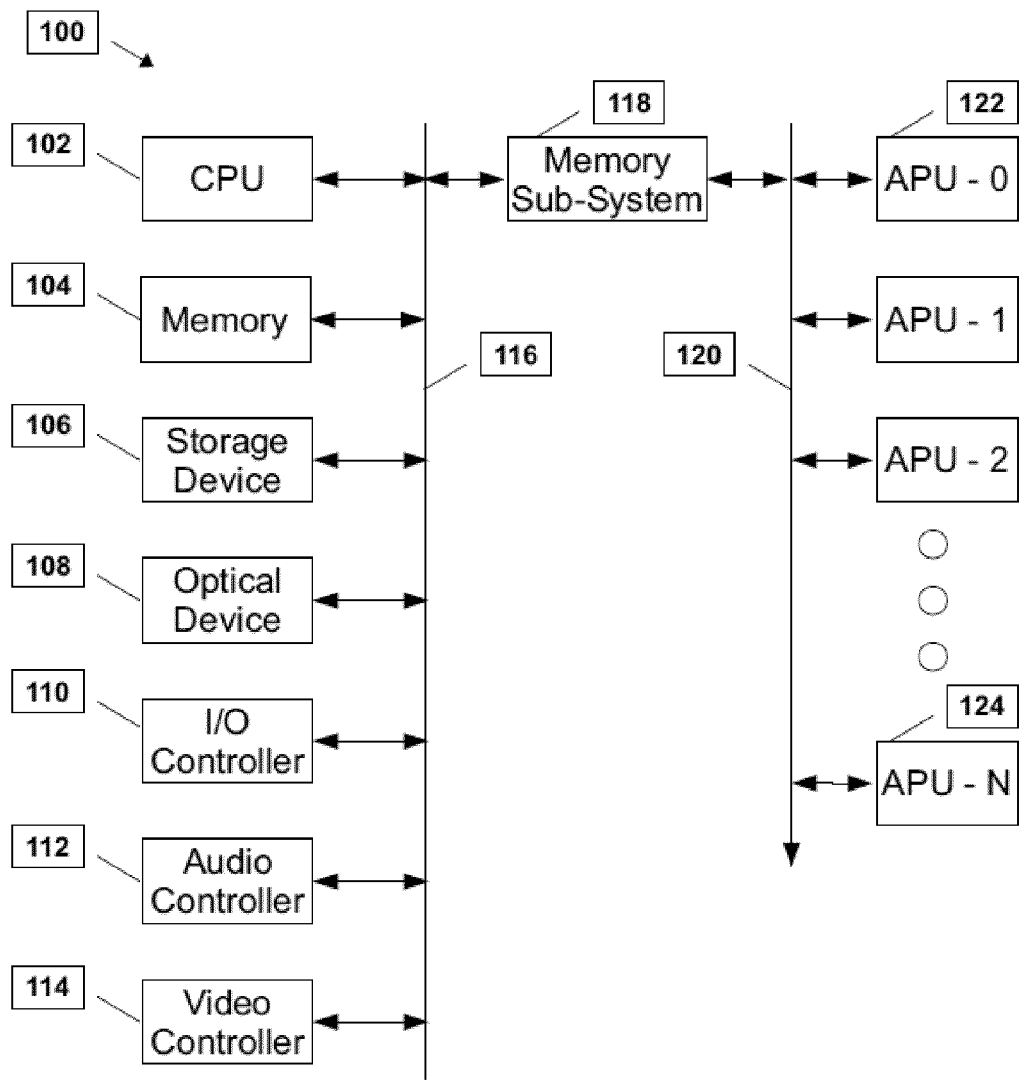
FIG. 1 is a diagram of an example computing system with a memory subsystem acting as an interface layer to an array of parallel processors.

FIG. 1 is a diagram of an example computing system with a memory subsystem acting as an interface layer to an array of parallel processors. FIG. 1 comprises a computer system 100 in which various components are coupled by a bus 116. Components coupled by bus 116 include CPU 102, memory 104, storage device 106, optical device 108, I/O controller 110, audio controller 112, video controller 114, and memory subsystem 118. Memory subsystem 118 is also referred to herein as a "memory management subsystem". Memory subsystem 118 is coupled with a second bus 120. Array Processing Units (APUs) 122 . . . 124, including APU-0, APU-1, APU-2 . . . , APU-N designating any number of processing units in an array of processing units, are also coupled with second bus 120. It will be appreciated that computer system 100 may include a wide range of additional components not illustrated in FIG. 1, and that various components illustrated in FIG. 1 may be omitted in some embodiments.

Computing system 100 may implement a parallel synchronous computing system including a host, the memory management subsystem 118, and the array of processing units 122 . . . 124. The host may be implemented in software stored in memory 104 and executable by CPU 102, and therefore, operations of CPU 102 may be described herein as operations of the host and vice versa. In some embodiments, a parallel synchronous computing system may be adapted for simulation, and in particular, for logic simulation, for example as described in U.S. patent application Ser. No. 13/851,859, entitled "Machine Transport and Execution of Logic Simulation", filed Mar. 27, 2013, and U.S. patent application Ser. No. 13/921,832, entitled "Real Time Logic Simulation within a Mixed Mode Simulation Network", filed Jun. 19, 2013, both of which are incorporated by reference herein.

Memory management subsystem 118 may comprise at least one memory subsystem layer adapted for deployment between the host CPU 102 and the array of processing units 122 . . . 124. The memory subsystem 118 in FIG. 1 is a symbolic place-holder for I/O processing performed by memory subsystem 118 for CPU 102 interface coupled to bus 116 and the APU 122 . . . 124 interfaces coupled to bus 120. In some implementations, the memory subsystem 118 may comprise a memory store, a controller comprising for example a PCIe port to the CPU 102, and a Configurable Deterministic Memory Network (CDMN), as described further herein, connecting to an Application Specific Integrated Circuit (ASIC) containing the array of processors implemented by APUs 122 . . . 124. Small implementations may comprise a sing memory store, a single controller, and/or a single ASIC, while larger implementations may comprise additional components. Example aspects of memory management subsystem 118 are described further in connection with FIG. 2.

In some embodiments, the CPU 102 may comprise one or more of a standard microprocessor, microcontroller, Digital Signal Processor (DSP) and/or similar. The present disclosure is not limited to the implementation of the CPU 102. In a similar manner the memory 104 may be implemented in a variety of technologies. The memory 104 may comprise one or more of RAM, Read Only Memory (ROM), and/or a variant standard of RAM. For the sake of convenience, the different memory types outlined are illustrated in FIG. 1 as memory 104. The memory 104 generally provides instructions and data for the processing by the CPU 102 as will be appreciated.

In some embodiments, system 100 may also have a storage device 106 such as a hard disk for storage of operating system, program data and applications. System 100 may optionally also include optical device 108 such as a CD-ROM or DVD-ROM. System 100 may also contain I/O controller 110 for supporting devices such as keyboards and cursor control devices. Other controllers typically in computer systems such as 100 are the audio controller 112 for output of audio and the video controller 114 for output of display images and video data alike. In some embodiments, a computational engine comprising memory subsystem 118, bus 120 and APUs 122 . . . 124 may be added to the computer system 100 through the bus 116.

The components described above may be coupled together by a bus system 116. The bus system 116 may include a data bus, address bus, control bus, power bus, proprietary bus, or other bus. The bus system 116 may be implemented in a variety of standards such as Peripheral Component Interconnect (PCI), PCI Express (PCIe), Accelerated Graphics Port (AGP) and the like.

In general, some embodiments of this disclosure may include arrays of Von Neumann architecture processors, e.g., APUs 122 . . . 124, connected through a dedicated network of memory systems and subsystems implemented via memory management subsystem 118 and configured as self sustaining communication circuits, and resulting apparatus and uses thereof.

There are a number of computing problems in which algorithms may be relatively simple but the data to be processed is enormous. In this class of computing problems is a sub-class in which the time between synchronization is very short, for example, in logic simulation problems. In this sub-class, the time for I/O and synchronization becomes restrictive and limits the speed of overall processing in conventional distributed processing. To optimize computing performance when computing tasks of this type, I/O and synchronization may be implemented at the memory bus level and I/O and synchronization may be transparent to host and distributed processors.

In the above described sub-class it is sometimes unnecessary for processors to be aware of inter-processor communications or synchronization. If each processor 122 . . . 124 has its input space and output space in its local RAM, and has a method of execution control, then I/O between processors 122 . . . 124 can be the responsibility of some other entity in the system 100.

In some embodiments, memory and processor I/O can be designed separately from the processors 122 . . . 124 themselves, that is, in a memory management subsystem 118. Furthermore, memory management subsystem 118 may be adapted to optimize memory and processor I/O for minimum latency and maximum I/O bandwidth.

In some embodiments, a memory and I/O subsystem implemented by memory management subsystem 118 may be autonomous in design, synchronous in execution and run-time configurable. Furthermore memory management subsystem 118 may be extensible across many physical memory buses and may be limited by the physics of the day governing how much memory and logic can be contained in a reasonable enclosure.

In some embodiments, memory management subsystem 118 may be configured to behave as a set of dedicated virtual circuits that effectively "route" data between processors 122 . . . 124 in the system 100 such that minimal host intervention, if any, need be required to support I/O traffic during the "communication" phase of a processing "superstep".

In some embodiments, a configurable memory I/O may be provided between memory systems and subsystems within memory management subsystem 118 such that a multiplicity of independent processors 122 . . . 124 can communicate with little or no host 102 intervention.

In some embodiments, the routing of memory data within memory management subsystem 118 may be configurable and self-sustaining Once configured by the host 102, any given communication circuit may be repeated from one superstep's communication phase to the next until changed by the host 102. In this sense "circuit" may be defined herein as the actual and/or virtual path a data object takes from a source memory to a destination memory.

In some embodiments, the synchronization of when computations and I/O communications is complete may be built into the memory management subsystem 118. In other words, "barrier" synchronization may be built-in.

In some embodiments, the memory management subsystem 118 may be extensible across many memory buses and can cross traditional bus boundaries. For example, though a host PCIe bus 116 may be 64-bit wide, the space addressable by the host 102 could be spread among many 64-bit wide buses, and across many PCBs optionally implementing the array of processing units 122 . . . 124.

Figure 2:
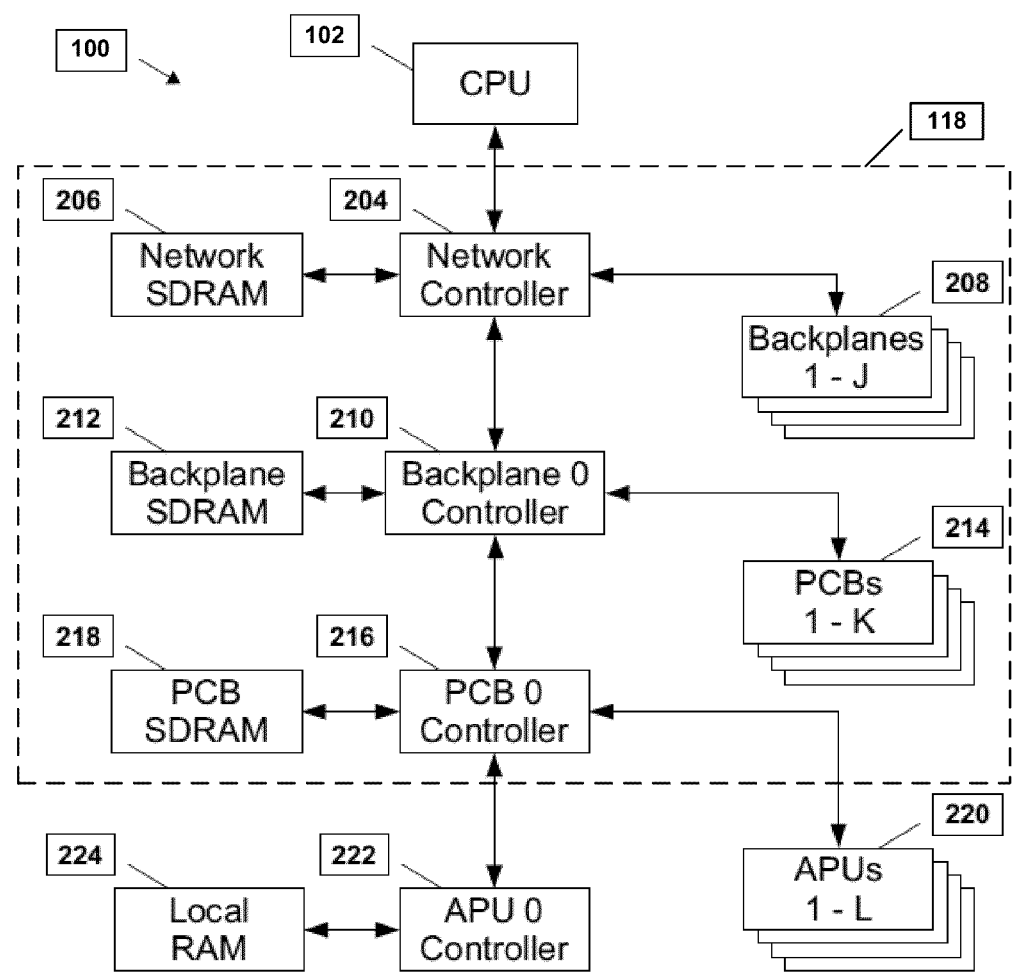
FIG. 2 is a diagram of an internal structure of an example memory subsystem comprising multiple memory subsystem layers.

In some embodiments, the memory management subsystem 118 may be both hierarchical and modular, as described further in connection with FIG. 2, such that the communication phase may be divided between a "local PCB" phase, a "backplane" phase or even a "network" phase.

In some embodiments, the behavior of bus 120 utilized by memory management subsystem 118 may be deterministic rather than dynamic. Since "routes" on bus 120 may be pre-configured, data movement on bus 120 may be by time-slots, delimiters and/or a mixture of other synchronous techniques such that there may be little or no wasted bandwidth and communication time may be pre-defined and perhaps minimized.

In some embodiments, computing system 100 may implement a form of BSP computing where at least some of, and in some examples, a majority of the synchronization and communication phases for processing by APUs 122 . . . 124 can be buried within a CDMN implemented by memory management subsystem 118 which may be transparent to the controlling host 102 and the parallel processors 122 . . . 124. Control and I/O may be memory mapped for both the host 102 and the parallel processors 122 . . . 124.

In more traditional BSP architectures, parallel processors may comprise conventional CPUs with their own resources to execute software written in C, Java, Fortran and other languages and coupled by a variety of techniques including conventional Ethernet. These constitute loosely coupled machines and part of the overhead for communication is carried in software of the parallel processors.

The "communication" phase of a BSP superstep is the part that cannot be parallelized since it is a sequential operation in most implementations. According to Amdahl's law the sequential portion will limit the effectiveness of more parallelism beyond the point where communication takes more time than computation. A CDMN implemented by memory management subsystem 118 may address this problem by operating at the speed of state-of-the-art SDRAM and through parallelism in data paths and controllers included in memory management subsystem 118, as described further in connection with FIG. 2.

In each APU 122 . . . 124, "memory mapped" I/O may be defined as each APU in a parallel array 122 . . . 124 having a portion of its local memory defined as an input buffer and another portion of its local memory defined as an output buffer. Both the APUs 122 . . . 124 and a CDMN implemented by memory management subsystem 118 may have access to these buffers.

In its simplest form, the host "memory mapped" I/O for a memory architecture may comprise an aggregation of APU I/O images being mapped to/from host memory 104. If we had a homogeneous array of N APUs with input buffers of size K and output buffers of size J, then the host may have an input memory buffer of N*K and an output memory buffer of size N*J. Both the host processor 102 and a CDMN in memory management subsystem 118 may have access to these buffers.

In more practical applications, this form of APU to/from host mapping maybe the least efficient method and may not be the desired mode of operation for some embodiments, since it may employ the host CPU 102 to the I/O connections between different APU images in its own memory space. This concept is presented here for the clarification of one possible role a CDMN in memory management subsystem 118 could play.

In some embodiments according to this disclosure, some portion of, and in some cases, most of the APU to APU communications may be handled directly by a CDMN in memory management subsystem 118 and may require minimal host 102 intervention. Furthermore a CDMN in memory management subsystem 118 may make use of space and time division and a hierarchical modularity to exceed what a host processor 102 may otherwise achieve with a single shared bus such as 116.

In some embodiments, a CDMN in memory management subsystem 118 may comprise a programmable circuit switch and a temporary data store that sits between entities in the system 100. It may be configured by the host 102 to route I/O data as needed from one part of the system 100, to the other, e.g. from one or more first APUs of the array 122 . . . 124 to one or more second APUs of the array 122 . . . 124, by "deterministic" mechanisms.

In some embodiments, a CDMN in memory management subsystem 118 may be defined by having no ambiguity of content at any time or phase. Whether parallel and/or serial content may be determined by properties like time slots, delimiters, pre-defined formats, fixed protocols, markers, flags, IDs and chip selects. Although there may be error detection/correction, in some examples there may be no point-to-point control, handshaking, acknowledgments, retries nor collisions. An example of "deterministic" may comprise a microprocessor memory bus.

A deterministic bus 120 can be designed such that the actual sustainable data transfer rate may be nearly the full bandwidth of the physical bus 120 itself. To create a memory architecture that is limited primarily by the speed of memory and bus construction, it may be prudent to use the highest bandwidth forms of both.

In some embodiments, memory, bus and processing arrays in system 100 may be designed as a high bandwidth data-flow such that the communication phase of the super step can be minimized. There may be no "one topology fits all" scenario here and as one goes from chip internals, board layer, backplane and unit layer designs the topology and technology may be implemented differently.

In some embodiments, a CDMN in memory management subsystem 118 may comprise a single component. For example, in tiny implementations of one aggressive ASIC on a PCIe plug in card for a Personal Computer (PC), a CDMN may comprise a single component. In some embodiments, a CDMN may comprise multiple components. For example, in aggressive server class equipment a CDMN may be included in B bays of racks, containing S shelves, containing P PCBs containing I ASICs containing A APUs. Massive parallelism of B*S*P*I*A APUs may be deployed.

FIG. 2 is a diagram of an internal structure of an example memory management subsystem comprising multiple memory subsystem layers. FIG. 2 includes computer system 100, including CPU 102 and memory subsystem 118. Memory subsystem 118 is arranged in multiple memory subsystem layers. A network layer includes a network controller 204 and a network SDRAM 206. A backplane layer includes example backplane 0 controller 210 and example backplane 0 SDRAM 212, and additional backplanes 1-J 208. A PCB layer includes example PCB 0 controller 216 and example PCB 0 SDRAM 218, and additional PCBs 1-K 214. FIG. 2 furthermore includes an array of processing units including an example APU 0 and additional APUs 1-L 220. Example APU 0 includes an APU 0 controller 222 and an APU 0 local RAM 224.

Memory management subsystem 118 as illustrated in FIG. 2 is adapted for deployment in a parallel synchronous computing system 100, the parallel synchronous computing system comprising a host 102, the memory management subsystem 118, and an array of processing units comprising APU 0-L. The memory management subsystem 118 comprises at least one memory subsystem layer, in this case, three layers including the network, backplane, and PCB layers, adapted for deployment between the host 102 and the array of processing units.

In some embodiments, memory subsystem 118 may be implemented as shown in FIG. 2 where memory subsystem 118 includes a hierarchy of memory subsystem layers. The CPU 202 may be configured to interact with the network controller's 204 memory 206 as a continuous image of the concatenated backplanes comprised of lead backplane 0 210 and other backplanes 1-J 208. The network controller 204 may be configured to manage communications between lead backplane controller 0 210 and other backplanes 208 as well as communications between network SDRAM 206, lead backplane controller 0 210 and other backplanes 208.

It will be understood that in FIG. 2, the illustrated network layer comprises a memory controller in the form of network controller 204 and a local memory in the form of network SDRAM 206. The network layer is adapted store, in the local memory 206, a continuous image of concatenated memories of components in a memory subsystem layer between the network layer and the processing units in the array, that is, a continuous image of concatenated memories of backplanes 0-J in the backplane layer. The memory controller 204 is adapted to manage communications between the local memory 206 and the components in the memory subsystem layer between the network layer and the processing units in the array, that is, by managing communications between the local memory 206 and the backplanes 0-J.

At the next layer down, the network controller 204 may be configured to interact with the lead backplane controller's 210 memory 212 as a continuous image of the concatenated PCBs comprised of the lead PCB 0 216 and the concatenated PCBs 1-K 214.

The backplane controller 210 may be configured to manage communications between the lead PCB controller 0 216 and other PCBs 214 as well between lead PCB 0 216, other PCBs 214 and backplane SDRAM 212. The illustrated backplane layer comprises a memory controller in the form of backplane controller 210 and a local memory in the form of backplane SDRAM 212. The backplane layer may be adapted store, in the local memory 212, a continuous image of concatenated memories of components in a memory subsystem layer between the backplane layer and the processing units in the array, that is, a continuous image of concatenated memories of PCBs 0-K in the PCB layer. The memory controller 210 may be adapted to manage communications between the local memory 212 and the components in the memory subsystem layer between the backplane layer and the processing units in the array, that is, by managing communications between the local memory 212 and the PCBs 0-K.

At the next layer down, the lead backplane controller 0 210 may be configured to interact with the lead PCB controller 0 216 memory 218 as a continuous image of the concatenated APUs comprised of the lead APU controller 0 222 and other APUs 1-L 220.

The lead PCB controller 0 216 may be configured to manage communications between the lead APU 0 222 and other APUs 220 as well as between lead APU0 222, other APUs 220 and PCB SDRAM 218. The illustrated PCB layer comprises a memory controller in the form of PCB controller 216 and a local memory in the form of PCB SDRAM 218. The PCB layer may be adapted store, in the local memory 218, a continuous image of concatenated memories of the processing units in the array, that is, a continuous image of concatenated memories of APUs 0-L. The memory controller 216 may be adapted to manage communications between the local memory 218 and the processing units in the array, that is, by managing communications between the local memory 218 and the APUs 0-L.

At the last layer, the lead PCB 0 controller 216 may be configured to interact with the lead APU controller 0 222 local RAM 224 as a single image which is the APU 222 local workspace memory. At this layer, memory is referred to as "local RAM" since it may for example be made up of SRAM blocks within a Field Programmable Gate Array (FPGA) or an ASIC.

Figure 3:
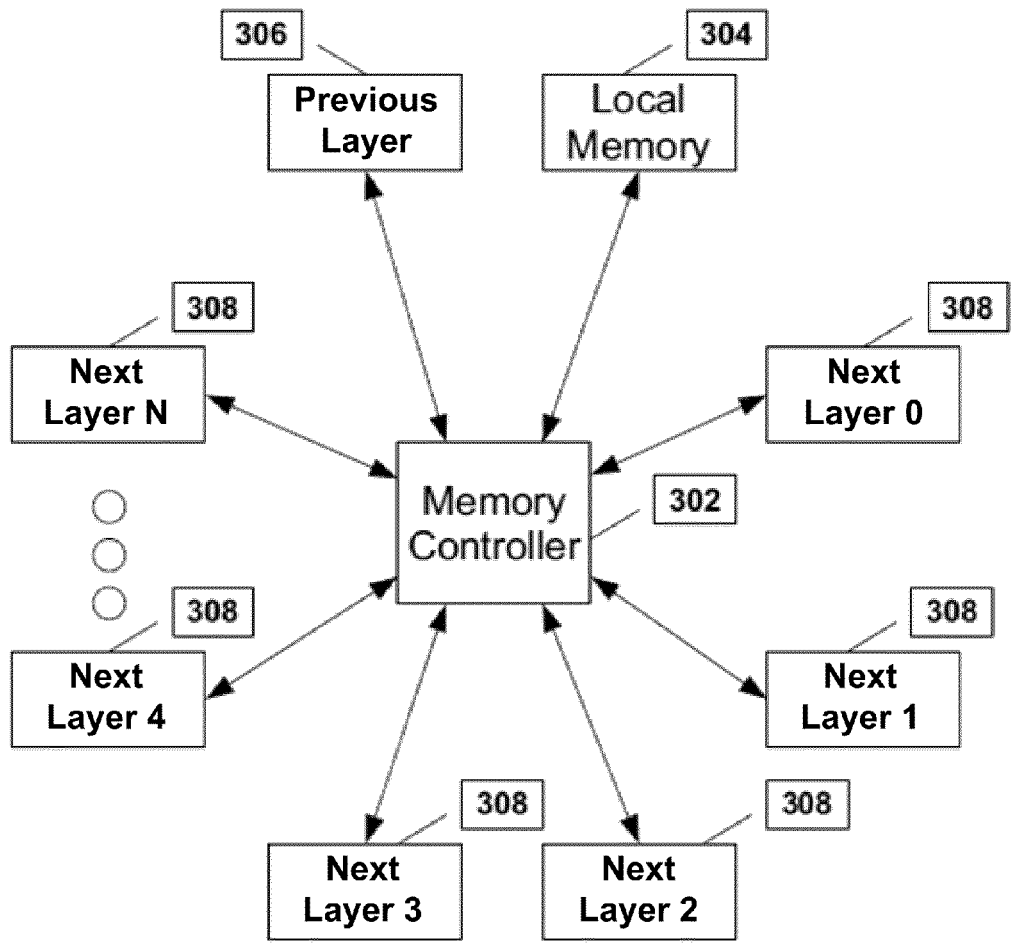
FIG. 3 is a diagram of an example interconnect structure of a memory subsystem layer.

Though different technologies may be used at each layer illustrated in FIG. 2, each layer may share similar properties, as may be understood with reference to FIG. 3. FIG. 3 is a diagram of an example interconnect structure of a memory subsystem layer. FIG. 3 includes a memory controller 302, a local memory 304, a previous layer 306, and a plurality of next layer components 308, including next layer components 0-N. In FIG. 3, there may be one control and data connection between the memory controller 302 and the previous layer 306. There may be N control and data connections between the memory controller 302 and next layer components 0-N.

In a network layer example, previous layer 306 may comprise host 102, memory controller 302 may comprise network controller 204, local memory 304 may comprise network SDRAM 206, and next layer components 308 may comprise backplanes 0-J. In a backplane layer example, previous layer 306 may comprise network controller 204, memory controller 302 may comprise backplane controller 210, local memory 304 may comprise backplane SDRAM 212, and next layer components 308 may comprise PCBs 0-K. In a PCB layer example, previous layer 306 may comprise backplane controller 210, memory controller 302 may comprise PCB controller 216, local memory 304 may comprise PCB SDRAM 218, and next layer components 308 may comprise the processing units of the array, namely APUs 0-L.

FIG. 3 illustrates a "star" configuration to imply independent paths and in some cases fully independent N x N crosspoint architectures maybe used where practical. Supporting concurrent multiple data paths may be relatively cheap and easy within FPGAs and ASICs but may become progressively more expensive and problematic as one goes between PCBs, backplanes and racks. To reduce I/O time, extensive use of multiple data paths maybe used in some embodiments.

Figure 4:
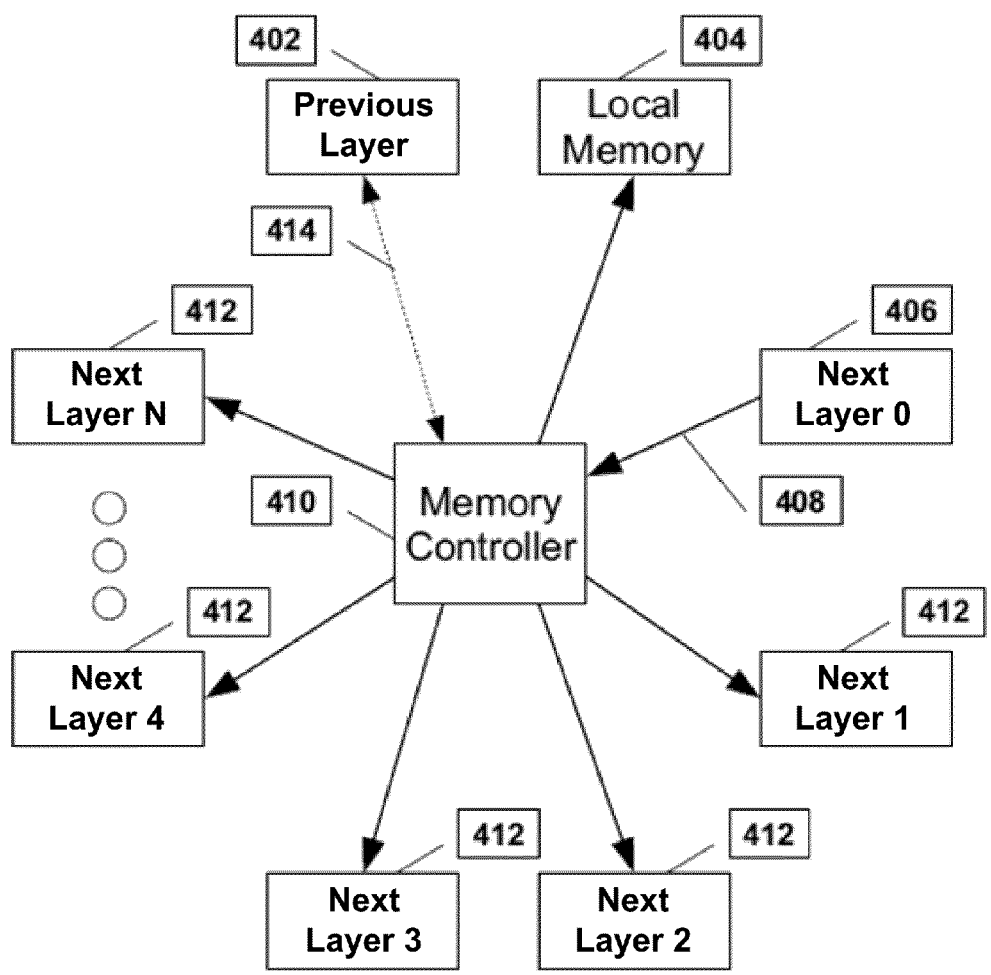
FIG. 4 is a diagram of an example memory mirror strategy for a memory subsystem layer.
Figure 5:
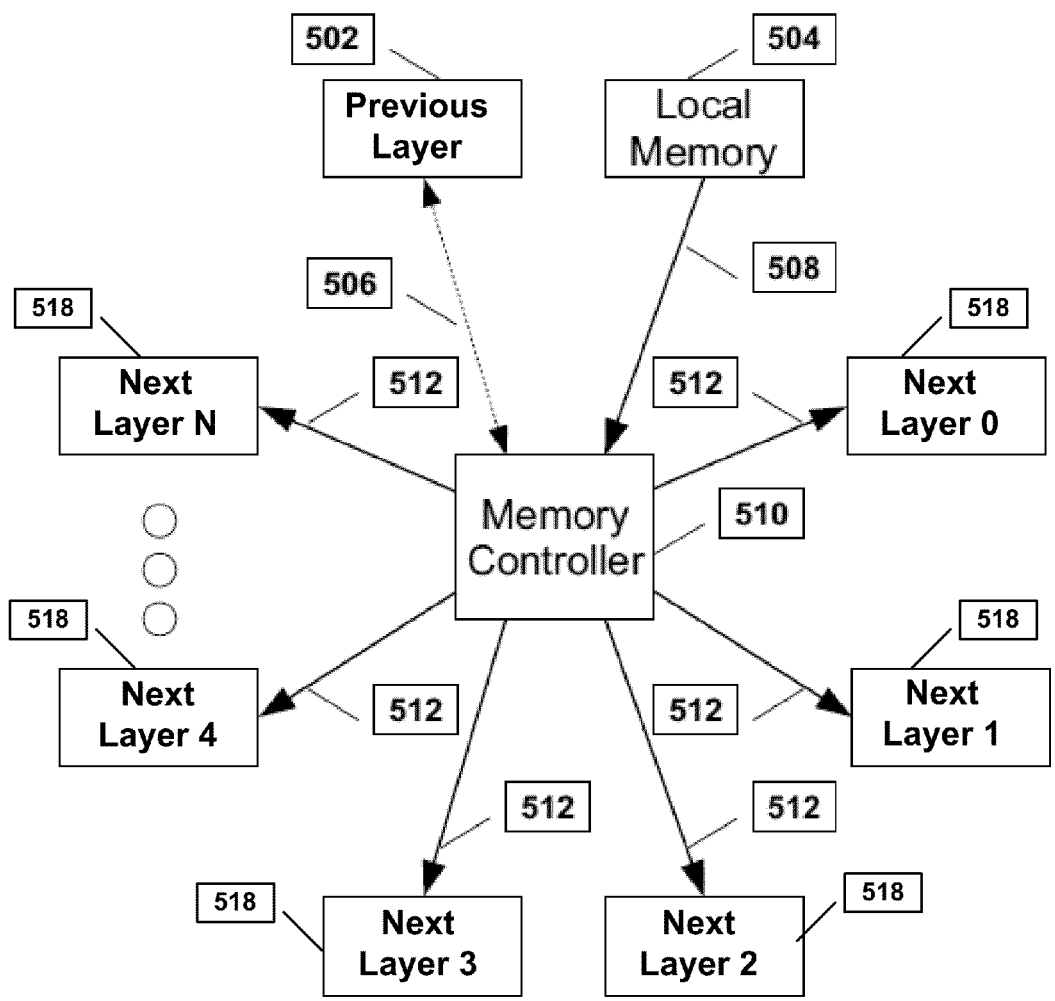
FIG. 5 is a diagram of an example memory broadcast strategy for a memory subsystem layer.
Figure 6:
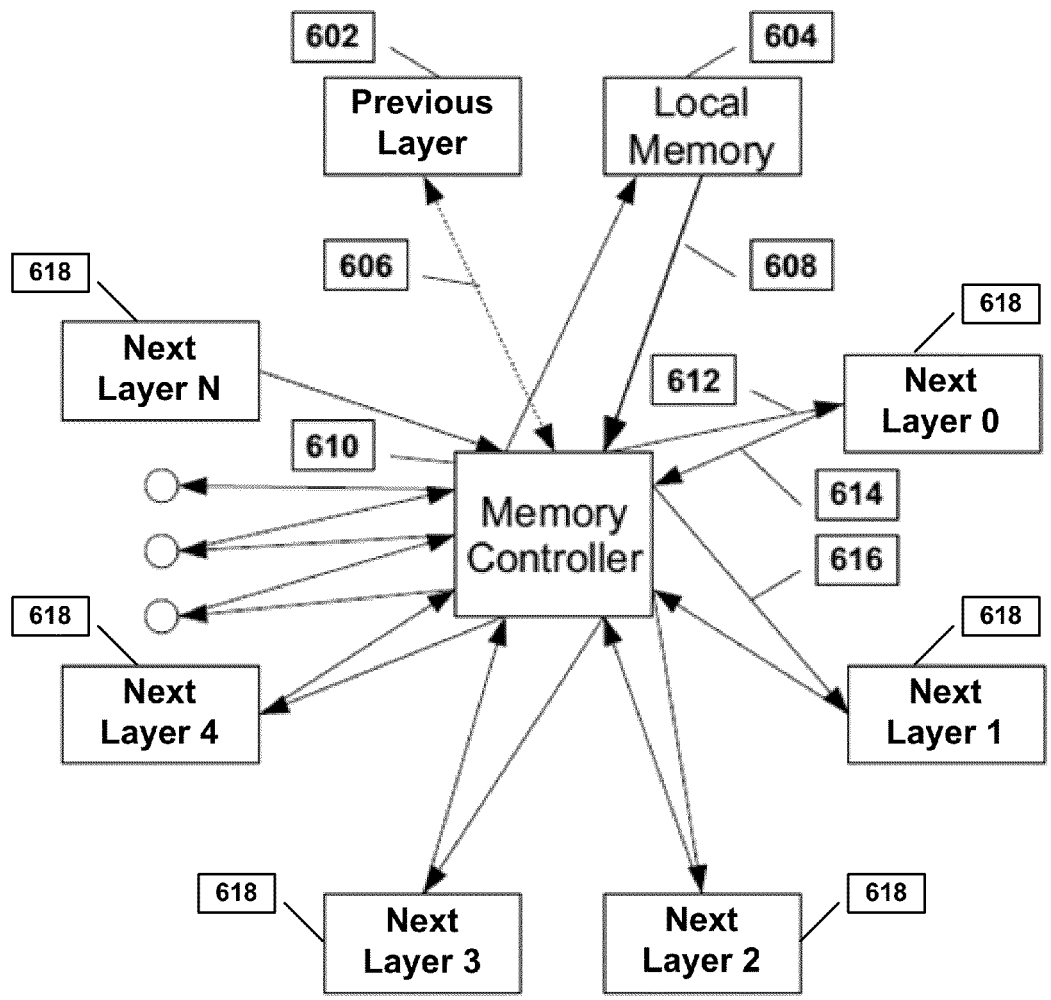
FIG. 6 is a diagram of an example point-to-point strategy for a memory subsystem layer.

In memory management subsystems according to FIG. 2 and FIG. 3, the memory controllers may be adapted to manage communications according to configuration settings received from the host. Configuration settings may comprise, e.g., system initialization settings and/or superstep I/O handling settings. System initialization settings may configure memory subsystem layers to provide run-time functionality to the processing units in the array. Once the processing units are initialized with desired run-time functionality, the host may provide superstep I/O handling settings to the memory subsystem layers to configure the memory subsystem layers to supply input data to, and receive output data from, the processing units in the array. FIG. 4, FIG. 5, and FIG. 6 illustrate example functions that may be carried out at any memory subsystem layer, and which functions may for example be deployed in response to configuration settings received from the host. It should be understood however that variations and additional functions may be deployed at memory subsystem layers as appropriate to implement embodiments of this disclosure.

FIG. 4 is a diagram of an example memory mirror strategy for a memory subsystem layer. FIG. 4 includes a memory controller 410, a local memory 404, a previous layer 402, a next layer 0 406, and a plurality of additional next layer components 412, including next layer components 1-N. Next layer 0 406 provides data 408 to memory controller 410. Memory controller 410 provides data 414 to previous layer 402.

In FIG. 4, next layer 0 406 may transmit data 408 to the memory controller 410 and data 408 may be forwarded to local memory 404 and the other next layers 412. Each of the "next layer" interfaces may take its turn to transmit data 408 in a "round robin" fashion until local memory 404 and all desired next layer interfaces contain a copy of what was transmitted. When this phase is complete, memory controller 410 may be configured to provide the host/previous layer 402 a copy 414 from local memory 404 to be mirrored at the host/previous layer 402. Note that this method does not require multiple physical data paths and could be time shared on a single common shared bus or ether.

A memory mirror function such as illustrated in FIG. 4 may be implemented at any memory subsystem layer, e.g., in response to receiving a memory mirror setting from the host. In general, the memory mirror setting may configure a memory controller 410 of a memory subsystem layer to place a copy of data in each of the memories of next layer components 406, 412, that is, either the components in a memory subsystem layer between the memory subsystem layer comprising the memory controller 410 and the processing units in the array, or, in memories of the processing units in the array themselves, as appropriate.

FIG. 5 is a diagram of an example memory broadcast strategy for a memory subsystem layer. FIG. 5 includes a memory controller 510, a local memory 504, a previous layer 502, and a plurality of next layer components 518, including next layer components 0-N. Communication 506 is transmitted between host/previous layer and memory controller 510. Data 508 is transmitted from local memory 504 to memory controller 510. Data 512 is transmitted from memory controller 510 to each of next layer components 518.

In FIG. 5, host/previous layer 502 may configure a communication 506 such that local memory 504 may be written 508 through the memory controller 510 which, in turn, transmits data 512 to all next layers 518. This method does not require multiple physical data paths and "memory broadcast" may be done on a single common shared bus or ether.

A memory broadcast function such as illustrated in FIG. 5 may be implemented at any memory subsystem layer, e.g., in response to receiving a memory broadcast setting from the host. In general, the memory broadcast setting may configure a memory controller 510 of a memory subsystem layer to broadcast data 508 received at the memory subsystem layer, e.g., at memory controller 510, to each of next layer components 518, that is, either the components in a memory subsystem layer between the memory subsystem layer comprising the memory controller 510 and the processing units in the array, or, the processing units in the array themselves, as appropriate.

FIG. 6 is a diagram of an example point-to-point strategy for a memory subsystem layer. Unlike the previous figures that cover communication on a one-to-many or a many-to-one relationship, this figure covers the situation of individual point-to-point communications. FIG. 6 includes a memory controller 610, a local memory 604, a previous layer 602, and a plurality of next layer components 618, including next layer components 0-N. Communication 606 is transmitted between host/previous layer and memory controller 610. Data 608 is transmitted from local memory 604 to memory controller 610. Data 612 is transmitted from memory controller 610 to next layer component 0. The combined data 606 and data 612 may constitute a single point-to-point transaction from previous layer 602 and next layer 0 618. Data 614 is transmitted from next layer component 0 to memory controller 610. Data 616 is transmitted from memory controller 610 to next layer component 1. The combined data 614 and data 616 may constitute a single point-to-point transaction from next layer 0 618 and next layer 1 618. Arrows indicate transmitting of data to and from each of the next layer components 618, as well as transmitting data from memory controller 610 to local memory 604.

In FIG. 6, host/previous layer 602 may configure a communication 606 such that the local memory 604 may act as a data source 608 through the memory controller 610 to provide data 612 to next layer component 0. This may be independent from next layer 0 acting as a data source 614 through the memory controller 610 to provide data 616 to next layer component 1. Conceptually, each next layer component X may communicate with next layer component X+1 through memory controller 610.

Unlike the mirrored or broadcast methods, a shared bus or ether may force one-at-a-time transmission for point-to-point strategies. Multiple separate physical data path may enhance communication bandwidth. Ideally if we have a separate path for each communication in FIG. 6, the I/O time may be the time to transmit the longest single transmission.

A point-to-point function such as illustrated in FIG. 6 may be implemented at any memory subsystem layer, e.g., in response to receiving a point-to-point setting from the host. In general, the point-to-point setting may configure a memory controller 610 of a memory subsystem layer to sequentially transmit and receive data to and from each of next layer components 618, that is, either the components in a memory subsystem layer between the memory subsystem layer comprising the memory controller 610 and the processing units in the array, or, the processing units in the array themselves, as appropriate.

Generically, in a parallel synchronous computing system, the array I/O implemented within the various layers of a memory subsystem may comprise a mixture of point-to-point, mirroring, broadcast, and other topologies, depending on the type of processing needed for a given scenario. Any architecture that can emulate a cross-point with independent concurrent circuits that can be configured as needed may provide a solution to reduce I/O time. In the presence of massively parallel computing it can be prohibitively expensive to get a true cross-point between all processors in an array. Fortunately, this level of connectivity isn't required for some areas of computer processing.

Figure 7:
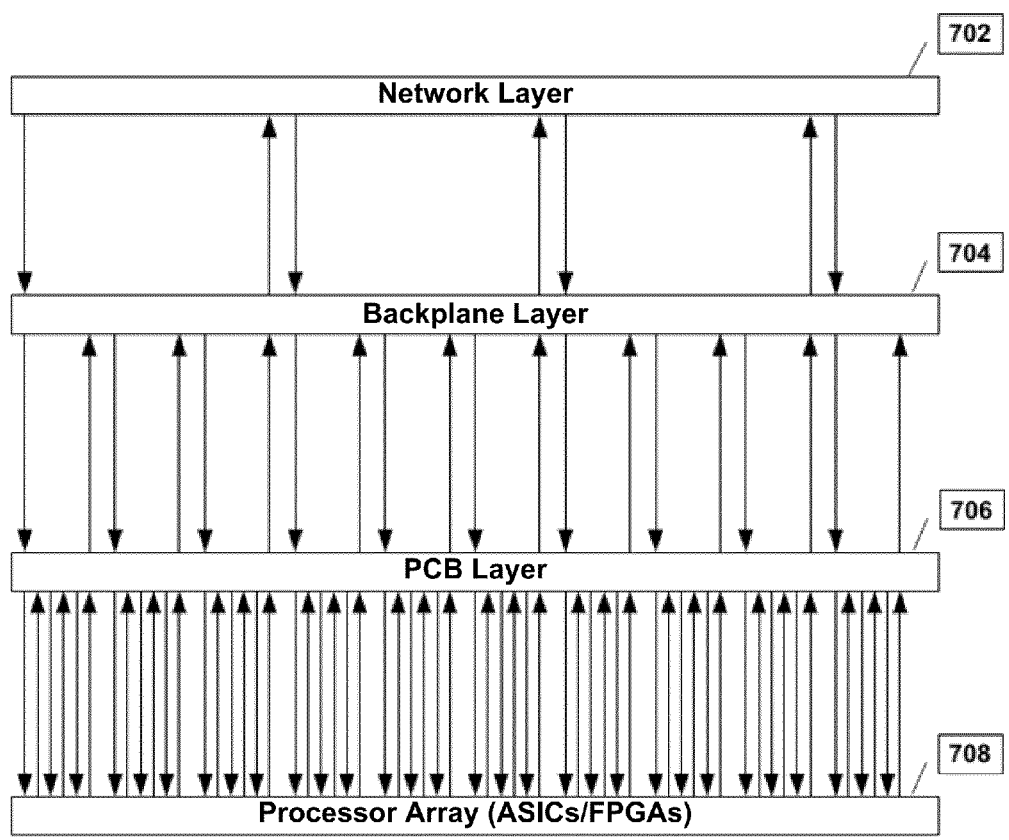
FIG. 7 is a diagram of an example hierarchical communication model for a memory subsystem comprising multiple memory subsystem layers.

FIG. 7 is a diagram of an example hierarchical communication model for a memory subsystem comprising multiple memory subsystem layers. FIG. 7 includes a network layer 702, a backplane layer 704, a PCB layer 706, and a processor array 708. Arrows between the layers represent I/O between the layers, and there may also be I/O between ASICs/FPGAs in the processor array 708. The majority of the I/O in a parallel synchronous computing system comprising elements such as illustrated in FIG. 7 may be between ASICs/FPGAs in the processor array 708, where the granularity of computation may comprise, e.g., individual models involved in a simulation, and the I/O between ASICs/FPGAs in the processor array 708 may represent the "coupling" between these models. In logic simulation, this may comprise gate layer models being connected together by local I/O to form higher layer circuits.

At the PCB layer 706, the I/O may be between higher-layer models supported by the ASIC/FPGA layer 708. In logic simulation these may represent complex sub-circuits of distinct functionality but still fairly low layer. At the backplane layer 704 these may be combined into fairly complete sub-systems of complex aggregate models. These, in turn, maybe combined at the network layer 704 into even larger models.

Figure 8:
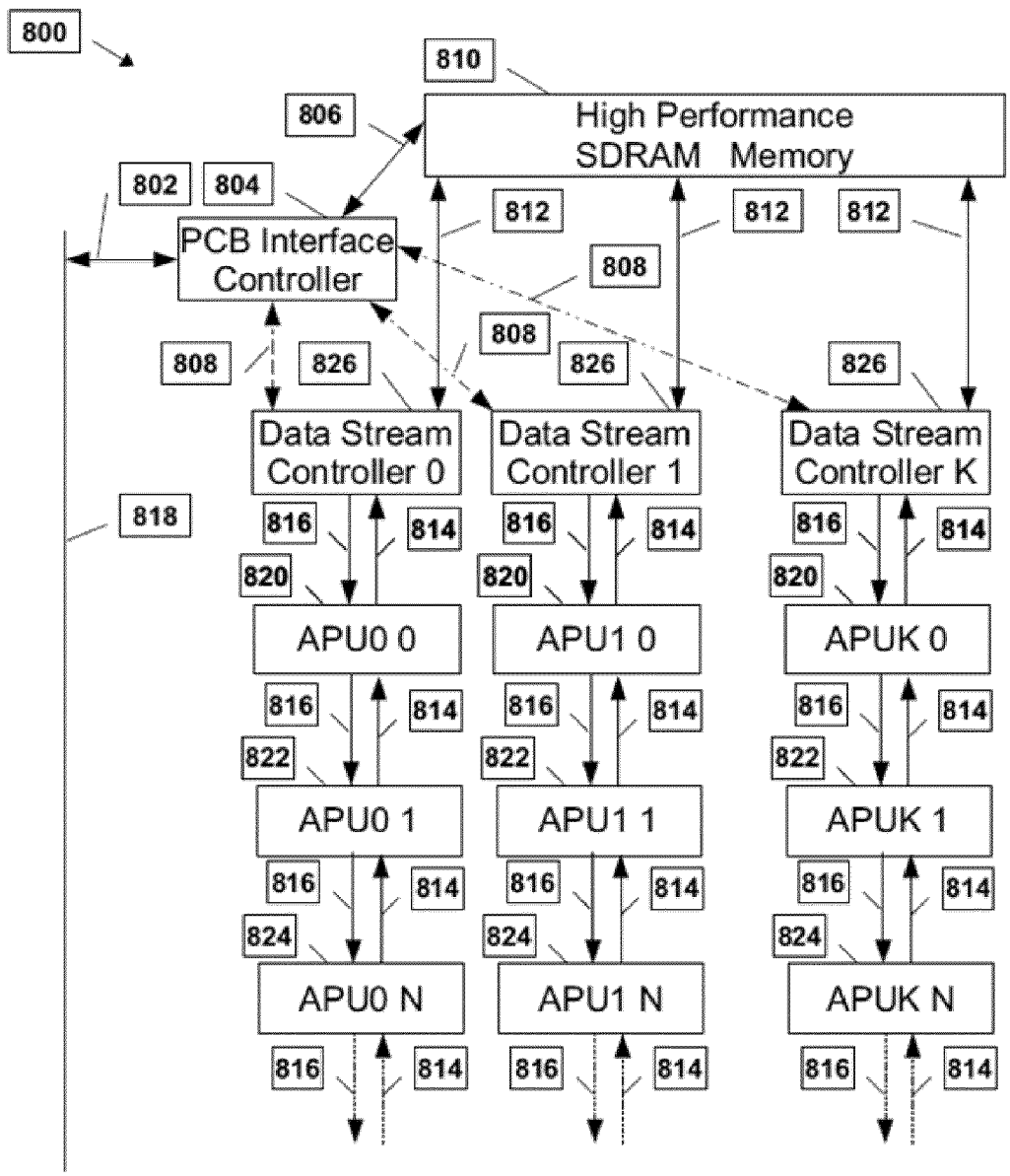
FIG. 8 is a diagram of an example PCB comprising an array of processors.

At the lowest layers inside of ASICs or FPGAs, our "cross-point" may comprise anything from an actual cross-point to something like what is shown in FIG. 8. FIG. 8 is a diagram of an example PCB comprising an array of processors. FIG. 8 includes a PCB 800 comprising a PCB interface controller 804, a high performance computational memory 810, and a plurality of Data Stream Controllers (DSCs) 826, including DSC 0, DSC 1, and/or further DSCs up to DSC K. Each DSC 826 is coupled with a sub-array of APUs. The sub-array of APUs for DSC 0 may comprise APU0 0, APU0 1, and/or further APUs up to APU0 N. The sub-array of APUs for DSC 1 may comprise APU1 0, APU1 1, and/or further APUs up to APU1 N. The sub-array of APUs for DSC K may comprise APUK 0, APUK 1, and/or further APUs up to APUK N. APUs 820 may be located one level away from DSCs 826. APUs 822 may be located two levels away from DSCs 826. APUs 824 may be located N levels away from DSCs 826, wherein "N" equals the last level of APU away from DSCs 826.

PCB interface controller 804 may be coupled to a bus system 818 by an interface 802. Bus system 218 may comprise, for example, bus system 116 in FIG. 1. PCB interface controller 804 may interact with high performance computational memory 810 by transactions 806. PCB interface controller 804 may interact with DSCs 826 by transactions 808. High performance computational memory 810, which may also be referred to herein as computational memory 810, may interact with DSCs 826 by transactions 812. Each DSC 826 may be coupled with an array of APUs by a bus having an inbound data stream 814 and an outbound data stream 816. Each APU within a sub-array of APUs may be coupled to each other in a linear fashion by the bus with inbound data stream 814 and outbound data stream 816.

In FIG. 8, the host bus 818 may provide the interface 802 to a local host compatible controller 804 into high performance SDRAM memory 810 to support its data 806 and also to configure and control one or more DSCs 826.

The DSCs 826 may comprise, for example, sophisticated Direct Memory Access (DMA) like controllers that drive an outbound sequential bus 816 and an inbound sequential bus 814 that may connect up to some or all of the APUs 820, 822, 824 sitting on that bus. By programming the DSCs 826 to send/receive particular blocks of data from/to memory 810 and programming the APUs 820, 822, 824 themselves to select from the outbound bus 816 as input and output data on the inbound bus 814 as output, the PCB 200 can emulate some of the functionality of a cross-point.

In practical implementations according to FIG. 8, the last APUs 824 on the sequential bus may provide a "loop back" connection between the outbound sequential bus 816 and the inbound sequential bus 814. Having both outbound and inbound busses 816, 814 pass through the same chip 824 may provide a "fully buffered" bus in each direction which may facilitate high speed chip-to-chip interfaces for APUs 822, 824, 826 which does not degrade as one adds APUs to lengthen the APU sub-arrays.

At this writing, the highest speed memory to implement high performance memory 810 is DDR3-2133 which is capable of 17,066 Million Bytes per second (MB/s) transfer rates. This exceeds the I/O capabilities of state-of-the-art FPGAs but not state-of-the-art gate arrays or ASICs. In either technology, the memory I/O time can still be shorter than the APU processing time. A maximum number of APUs on each sequential bus may be determined as a number of APUs sufficient to bring the I/O processing time up to the level of processing time. If the sequential bus I/O bandwidth is significantly less, e.g., 50% or less, than the I/O bandwidth for memory 810, then each piece of memory 810 may feed two or more DSCs 826.

In some embodiments, the high performance memory 810 can be made up of many SDRAM chips. In a practical application, memory 810 could be designed as N each 64-bit memory buses using DDR3-2133 giving an effective memory I/O transfer rate of N* 17,066 MB/s. If connected to a PCIe implementation of the PCB interface controller 804, the high performance SDRAM memory 810 may appear to the host (e.g. the CPU 102 in FIG. 1) as concatenated memory space with N times the addresses of a single memory bus and 64-bits wide. A design constructed as illustrated in FIG. 8 may have a host I/O burst bandwidth that is 1/N of the total memory bandwidth to the DSCs 826. Due to burst limitations under PCIe protocols, the actual host bandwidth may be 20 to 50% of the PCIe burst bandwidth. This illustrates the importance of inter-APU I/O being handled by the on-board controllers and circuits with preferably little host intervention.

In some embodiments, PCB 800 may implement a simulation network, for example as described in U.S. patent application Ser. No. 13/851,859, entitled "Machine Transport and Execution of Logic Simulation", filed Mar. 27, 2013, and/or U.S. patent application Ser. No. 13/921,832, entitled "Real Time Logic Simulation within a Mixed Mode Simulation Network", filed Jun. 19, 2013.

Figure 9:
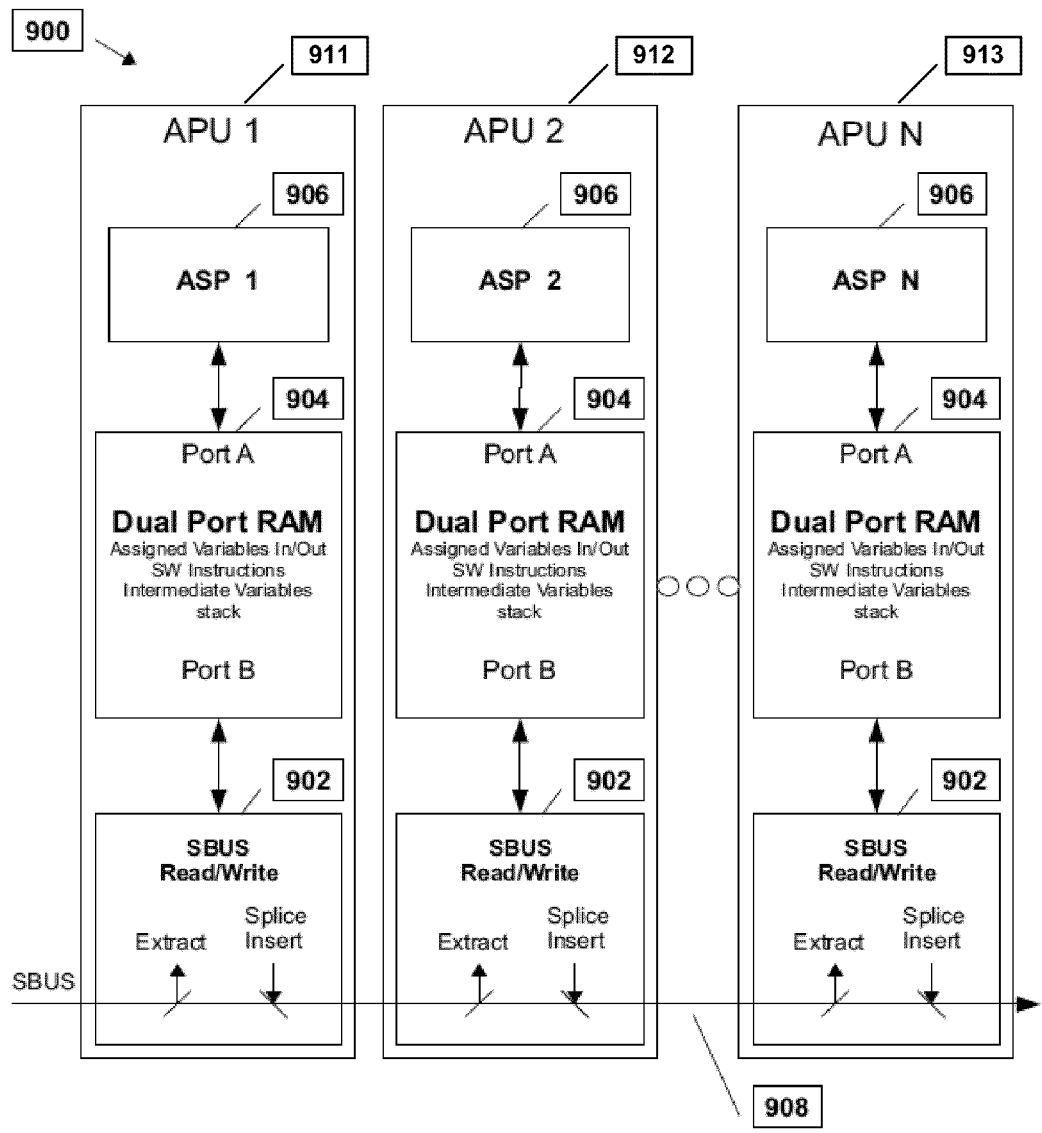
FIG. 9 is a diagram of example internals for processing units in a parallel synchronous computing system.

FIG. 9 is a diagram of example internals for processing units, such as APUs 820, 822, 823 in a parallel synchronous computing system. FIG. 9 illustrates an example sub-array of processing units 900, comprising APUs 911, 912, and 913. APU construction and connection to a Sequential Bus (SBUS) 908 is illustrated for each of the APUs 911, 912, and 913. Each of the APUs 911, 912, and 913 comprises a processor 906, a local memory 904, and an SBUS interface 902 coupled with SBUS 908.

SBUS interfaces 902 may be configured by a hosting computer (e.g., by CPU 102 in FIG. 1) to recognize and respond to commands, delimiter or predetermined time-slots such that the interfaces 902 may know when to extract controls and/or data from the SBUS 908 during an input phase and when to output data and status to SBUS 908 during an output phase. These APU I/O transfers may transfer data between the SBUS 908 and memory 904, e.g., a port of a dual port RAM implementing memory 904.

Memory 904 may be implemented by a local dual port RAM 904 in each of APUs 911, 912, and 913. In some embodiments, memory 904 may comprise static RAM (SRAM) blocks within FPGA or ASIC implementations of the APU sub-array 900. Techniques and architectures disclosed herein are not restricted to any particular form. In some embodiments, for example, local dual port RAM could be implemented with SDRAM and special controllers to allow the SDRAM to emulate dual port behavior and yet support a full general purpose processor.

To be maximally effective for massive parallelism, the processors 906 may comprise Application Specific Processors (ASPs) that could be configured, for example, as anything from a simple state machine processing data in RAM 904, to a fairly sophisticated conventional processor executing machine instructions from RAM 904 and processing data within RAM 904. In either case, the execution of the processors 906 may be triggered by input from the SBUS 908 and completion status of the processors 906 may be sent out on the SBUS 908.

The local RAM 904 need not be dual port however in some embodiments the dual port nature of RAM 904 may allow concurrent access to the RAM 904 by the processors 906 and SBUS interfaces 902 so that processing and I/O time can overlap. Though this may have limited application for BSP computing, such arrangements may be of benefit to non-BSP computing where I/O may be double buffered.

Figure 10:
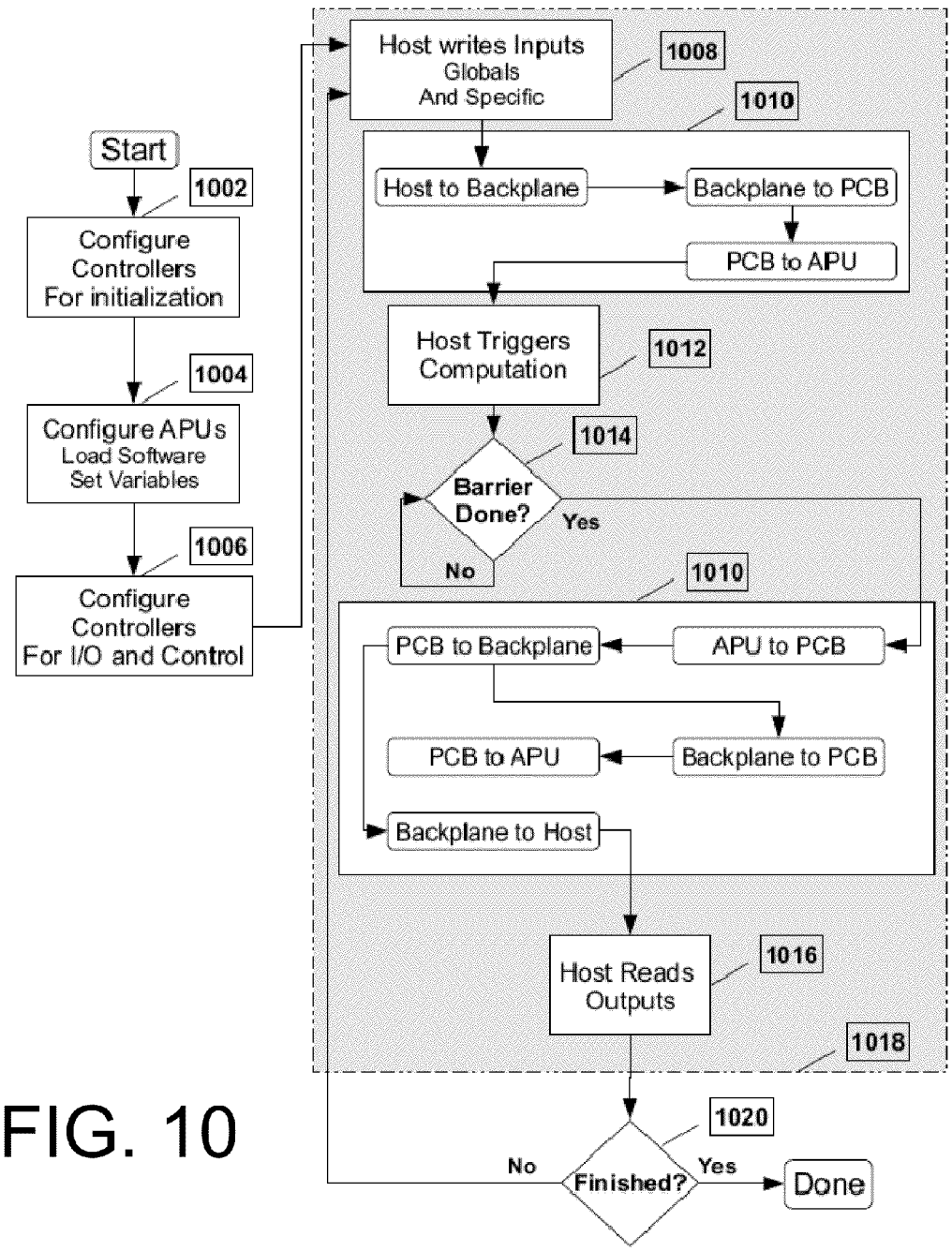
FIG. 10 is a flow chart diagramming an example processing method which makes use of memory management techniques disclosed herein.

FIG. 10 is a flow chart diagramming an example processing method which makes use of memory management techniques disclosed herein using a three layer CDMN system comprised of host layer, backplane layer, and PCB layer memory controllers to manage a superstep over APUs in a parallel synchronous computing system. In contrast, FIG. 2 illustrates embodiments comprising four layers, e.g., including network controller 204 in addition to the memory controllers in embodiments according to FIG. 10. This disclosure is not limited to any specific number of layers. FIG. 10 includes system initialization blocks 1002, 1004, and 1006, superstep I/O handling blocks 1018, and a finish block 1020.

In some embodiments, methods according to FIG. 10 may perform a BSP superstep within the context of general BSP computing and according to this disclosure. Example methods may start with "Configure Controllers for Initialization" block 1002, wherein a CDMN and other controllers may be configured for system initialization. System initialization may include the configuration of any FPGAs in an array of processors with run-time functionality which, when combined with ASICs and other components, may complete a hardware platform in preparation for a given application architecture.

System initialization may continue with "Configure APUs" block 1004. Block 1004 may comprise loading software into the APUs, setting variables, and assigning properties. In embodiments wherein loading software may be "broadcast" to many APUs, each of those APUs in a broadcast group may be provided with unique variable and property assignments. There may also be APUs loaded with unique code, data and properties.

At a "Configure Controllers" block 1006, memory controllers in the memory management subsystem may be configured for I/O and control, for superstep I/O handling in block

1018. System initialization operations at block 1006 may configure a CDMN and, optionally, other controllers for superstep I/O handling. After step 1006, the host 102 may be able to do I/O specific to the supplying input data and control to a distributed system, e.g., by supplying input data and control to a memory management subsystem 118, and to receive status and data from the distributed system, e.g., from memory management subsystem 118. Though host operations may include handling I/O for a subset of the APUs in the system, a majority of the APU I/O maybe handled autonomously by the CDMN in memory management subsystem 118 and other controllers contained in the superstep cycle implemented by block 1018.

Superstep I/O handling block 1018 may implement a superstep cycle comprising a "Host Writes Inputs" block 1008, a first "CDMN Operations" block 1010, a "Host Triggers Computations" block 1012, a "Barrier Done?" block 1014, a second "CDMN Operations" block 1010, and a "Host Reads Outputs" block 1016.

At the "Host Writes Inputs" block 1008, the superstep cycle may start with the host 102 writing global and specific values to APUs in a processor array through a memory subsystem comprising a CDMN, such as memory subsystem 118. At a first "CDMN Operations" block 1010, the outbound CDMN operations are shown as including three steps. First, at a "Host to Backplane" step, host layer memory controllers may write to one or more backplanes (e.g., backplanes 0-J in FIG. 2). Next, at a "Backplane to PCB" step, each backplane controller (e.g., backplane controllers 0-J in FIG. 2) may write to one or more PCBs (e.g., PCBs 0-K in FIG. 2). Next, at a "PCB to APU" step, each PCB controller (e.g., PCBs 0-K in FIG. 2) may write to one or more APUs (e.g., APUs 0-L in FIG. 2). The illustrated steps can be thought of as three sequential time intervals of unavoidable time lapse in the computation cycle. For simulation computing, this represents a small amount of data which generally won't take much time.

At a "Host Triggers Computations" block 1012, an explicit command from the host 102 may be issued to begin computation after the input operations of first block 1010 are complete. In some embodiments, triggering computations at block 1012 may be performed automatically upon completion of any APU's portion of the input. The automatic trigger may be more efficient per superstep since it may allow at least part of the processing time to overlap the communication phase leading to a shorter superstep cycle time.

At a "Barrier Done?" block 1014, whichever type of computational trigger is used, the host 102 may wait till a "barrier" is satisfied before continuing. Since the barrier may be the completion of the APU processing and that may be handled automatically by the CDMN and other controllers, in some embodiments the barrier decision can be done by host interrupt which can free the host processor 102 from "polling" for status, allowing the host processor 102 to use its processing time for whatever other processes or I/O may be needed with the outside world.

With the barrier condition complete at block 1014; the second "CDMN Operations" block 1010 may proceed. The second "CDMN Operations" block 1010 may comprise APU output transactions to move computational APU output to wherever it is needed to carry out parallel synchronous processing. In some embodiments, "local" transactions may represent a majority of APU output transactions and may comprise APU-to-APU processing with little or no host intervention. APU output transactions may also comprise, for example, APU to PCB and PCB to APU transactions to implement APU output transactions between APUs on different PCB controllers with little or no host intervention. APU output transactions may also comprise, for example, APU to PCB, PCB to backplane, backplane to PCB, PCB to APU output transactions to implement APU output transactions between APUS on different PCBs. APU output transactions may comprise up to all of the internal CDMN output which requires little or no host intervention, depending upon configuration settings applied within the memory subsystem 118.

Second "CDMN Operations" block 1010 may also comprise APU-to-host output transactions. APU-to-host output transactions may comprise, e.g., APU to PCB output transactions, PCB to backplane output transactions, and backplane to host output transactions. Block 1010 diagrams the worst case paths of APU-to-APU and APU-to-host output transactions, which worst case paths may be the primary concern when considering computational throughput. Though these connections represent the worst case propagation times (three delay times) they may represent a small percentage of the APU-to-APU bandwidth in some embodiments.

At a "Host Reads Outputs" block 1016, when APU-to-APU I/O at second block 1010 is complete, the host 102 may read outputs from the array of processing units. At a "Finished?" block 1020, when the last read is made, the process may come to an end. If not, the cycle may repeat with the host supplying new inputs at block 1008.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof. Designing the circuitry and/or writing the code for the software and or firmware would be within the skill of one of skill in the art in light of this disclosure.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely examples and that in fact many other architectures may be implemented which achieve the same functionality.

While certain example techniques have been described and shown herein using various methods, devices and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

The invention claimed is:

1. A memory management subsystem adapted for deployment in a parallel synchronous computing system, the parallel synchronous computing system comprising a host, the memory management subsystem, and an array of processing units, the memory management subsystem comprising:
    at least one memory subsystem layer adapted for deployment between the host and the array of processing units, wherein the at least one memory subsystem layer comprises:
        a memory controller; and
        a local memory;
    wherein the at least one memory subsystem layer is adapted store, in the local memory, either:
        a continuous image of concatenated memories of the processing units in the array; or
        a continuous image of concatenated memories of components in a memory subsystem layer between the at least one memory subsystem layer and the processing units in the array;
    wherein the memory controller is adapted to manage communications between the local memory and either:
        the processing units in the array; or
        the components in the memory subsystem layer between the at least one memory subsystem layer and the processing units in the array.

2. The memory management subsystem of claim 1, wherein the at least one memory subsystem layer comprises a network layer adapted to store, in the local memory, a continuous image of concatenated backplane memories of backplane components in a backplane layer between the network layer and the processing units in the array.

3. The memory management subsystem of claim 1, wherein the at least one memory subsystem layer comprises a backplane layer adapted to store, in the local memory, a continuous image of concatenated Printed Circuit Board (PCB) memories of PCB components in a PCB layer between the backplane layer and the processing units in the array.

4. The memory management subsystem of claim 1, wherein the at least one memory subsystem layer comprises a Printed Circuit Board (PCB) layer adapted to store, in the local memory, a continuous image of concatenated memories of the processing units in the array.

5. The memory management subsystem of claim 1, wherein the memory management subsystem comprises network layer, a backplane layer, and a Printed Circuit Board (PCB) layer.

6. The memory management subsystem of claim 1, wherein the memory controller is adapted to manage communications according to a configuration setting received from the host.

7. The memory management subsystem of claim 6, wherein the configuration setting comprises a system initialization setting to configure the at least one memory subsystem layer to provide run-time functionality to the processing units in the array.

8. The memory management subsystem of claim 6, wherein the configuration setting comprises a superstep Input/Output (I/O) handling setting to configure the at least one memory subsystem layer to supply input data to, and receive output data from, the processing units in the array.

9. The memory management subsystem of claim 6, wherein the configuration setting comprises a memory mirror setting to configure the at least one memory subsystem layer to place a copy of data in each of the memories of the processing units in the array or each of the memories of components in the memory subsystem layer between the at least one memory subsystem layer and the processing units in the array.

10. The memory management subsystem of claim 6, wherein the configuration setting comprises a memory broadcast setting to configure the at least one memory subsystem layer to broadcast data received at the at least one memory subsystem layer to each the of processing units in the array or to each of the components in the memory subsystem layer between the at least one memory subsystem layer and the processing units in the array.

11. The memory management subsystem of claim 6, wherein the configuration setting comprises a point to point setting to configure the at least one memory subsystem layer sequentially transmit and receive data to and from each of the processing units in the array or to and from each of the components in the memory subsystem layer between the at least one memory subsystem layer and the processing units in the array.

12. The memory management subsystem of claim 1, wherein the parallel synchronous computing system is adapted for logic simulation.

13. A memory management method adapted for deployment in a parallel synchronous computing system, the parallel synchronous computing system comprising a host, a memory management subsystem comprising at least one memory subsystem layer deployed between the host and an array of processing units, and the array of processing units, the memory management method comprising:
    storing, by the at least one memory subsystem layer in a local memory within the at least one memory subsystem layer, either:
        a continuous image of concatenated memories of the processing units in the array; or
        a continuous image of concatenated memories of components in a memory subsystem layer between the at least one memory subsystem layer and the processing units in the array; and
    managing, by a memory controller in the a at least one memory subsystem layer, communications between the local memory and either:
        the processing units in the array; or
        the components in the memory subsystem layer between the at least one memory subsystem layer and the processing units in the array.

14. The memory management method of claim 13, wherein the at least one memory subsystem layer comprises either a network layer, a backplane layer, or a Printed Circuit Board (PCB) layer, and wherein:

the network layer is adapted to store, in a local memory, a continuous image of concatenated backplane memories of backplane components in the backplane layer which is between the network layer and the processing units in the array;

the backplane layer is adapted to store, in a local memory, a continuous image of concatenated Printed Circuit Board (PCB) memories of PCB components in the PCB layer which is between the backplane layer and the processing units in the array; and the PCB layer is adapted to store, in a local memory, a the continuous image of concatenated memories of the processing units in the array.

15. The memory management method of claim 13, wherein the memory management subsystem comprises a network layer, a backplane layer, and a Printed Circuit Board (PCB) layer.

16. The memory management method of claim 13, wherein managing communications by the memory controller is performed according to a configuration setting received from the host.

17. The memory management method of claim 16, wherein the configuration setting comprises a system initialization setting to configure the at least one memory subsystem layer to provide run-time functionality to the processing units in the array.

18. The memory management method of claim 16, wherein the configuration setting comprises a superstep Input/Output (I/O) handling setting to configure the at least one memory subsystem layer to supply input data to, and receive output data from, the processing units in the array.

19. The memory management method of claim 16, wherein the configuration setting comprises:

a memory mirror setting to configure the at least one memory subsystem layer to place a copy of data in each of the memories of the processing units in the array or each of the memories of components in the memory subsystem layer between the at least one memory subsystem layer and the processing units in the array;

a memory broadcast setting to configure the at least one memory subsystem layer to broadcast data received at the at least one memory subsystem layer to each of the processing units in the array or to each of the components in the memory subsystem layer between the at least one memory subsystem layer and the processing units in the array; or a point to point setting to configure the at least one memory subsystem layer to sequentially transmit and receive data to and from each of the processing units in the array or to and from each of the components in the memory subsystem layer between the at least one memory subsystem layer and the processing units in the array.

20. The memory management method of claim 13, wherein the parallel synchronous computing system is adapted for logic simulation.

* * * * *